UNITED STATES PATENT OFFICE.

MARMADUKE OSBORNE, OF NEW YORK, N. Y.

IMPROVEMENT IN FELTING FOR COATS, HATS, &c.

Specification forming part of Letters Patent No. 2,646, dated May 28, 1842; extended seven years; Reissue No. 631, dated November 30, 1858.

*To all whom it may concern:*

Be it known that I, MARMADUKE OSBORNE, of the city, county, and State of New York, have invented an Improved Mode of Making Gloves, Hose, Coats, and other Articles of Wearing Apparel, of which wool, hair, fur, &c., is the principal material; and I hereby declare and ascertain my invention as follows.

The material, whether pure or mixed, is formed into "bats" or sheets by any of the known processes suited to the manufacture, bowed either by hand or by machinery, through which wool, fur, hair, or either of them alone or when mixed with a silk, cotton, or other vegetable or non-felting material in such proportion of the felting material, leaving the largest proportion of the felting material, so that it can be felted or worked. Two or more of such bats are laid one upon the other, with an inlayer made of paper, silk, muslin, or such like material cut to the pattern of the article to be made placed between them, covering all parts of the bats that are not to be united. This inlayer is applied to the bats in their soft state. In this state the bats go through a process of felting, which unites their surfaces not covered by the pattern or inlayer. The felting may be done in any of the usual and well-known ways. The projecting portions of the bats are not to be folded over each other, as in ordinary cases of hat-making, &c., but lie flat, working the portions not separated by the inlayer into union. After the union of the proper parts is thus effected the inlayer is removed and all the superfluous parts of the united felted bats are to be removed by cutting and the proper separating in the article made, such as separating the fingers of gloves, &c. This completes the manufacture, which is then ready for trimming in any way.

What I claim in the above-described invention, and desire to secure by this reissue of my Letters Patent, is—

The above-described method of manufacturing articles of wearing apparel, of which wool or other similar animal fiber constitutes a larger part, as above set forth, substantially in the manner and for the purposes herein described.

In testimony whereof I have hereto subscribed my name.

MARMADUKE OSBORNE.

In presence of—
NATHAN H. HARTMAN,
M. G. WEBB.